United States Patent [19]

Coleman et al.

[11] 4,271,056

[45] Jun. 2, 1981

[54] HYDROPHILIC ACRYLONITRILE POLYMERS FOR MELT-SPINNING

[75] Inventors: Denis Coleman, Stamford, Conn.; Anthony Koroscil, Pensacola, Fla.

[73] Assignee: American Cyanamid Company, Stamford, Conn.

[21] Appl. No.: 149,780

[22] Filed: May 14, 1980

Related U.S. Application Data

[60] Division of Ser. No. 67,247, Sep. 17, 1979, abandoned, which is a continuation-in-part of Ser. No. 13,776, Feb. 21, 1979, abandoned.

[51] Int. Cl.$^3$ .............................................. C08L 33/20
[52] U.S. Cl. ...................... 260/29.6 AN; 264/176 F; 264/206; 526/320
[58] Field of Search ................ 260/29.6 AN; 526/320

[56] References Cited

U.S. PATENT DOCUMENTS

| | | | |
|---|---|---|---|
| 2,585,444 | 2/1952 | Coxe | 260/29.6 AN |
| 3,388,202 | 6/1968 | Opferkuch, Jr. et al. | 260/31.2 N |
| 3,402,231 | 9/1968 | Bynum et al. | 260/29.6 AN |
| 3,896,204 | 7/1975 | Goodman et al. | 260/29.6 AN |
| 3,984,601 | 10/1976 | Blickenstaff | 260/29.6 AN |

FOREIGN PATENT DOCUMENTS

| | | |
|---|---|---|
| 2403947 | 8/1974 | Fed. Rep. of Germany . |
| 47-7730 | 3/1972 | Japan ........................................ 526/320 |
| 1446649 | 8/1976 | United Kingdom . |

*Primary Examiner*—Stanford M. Levin
*Attorney, Agent, or Firm*—Frank M. Van Riet

[57] ABSTRACT

Terpolymers of acrylonitrile, a hydrophobic comonomer, and a hydrophilic acrylate ester provide meltspun acrylonitrile polymer fiber of improved dyeing characteristics.

7 Claims, No Drawings

HYDROPHILIC ACRYLONITRILE POLYMERS FOR MELT-SPINNING

CROSS-REFERENCE TO RELATED APPLICATIONS

This application is a division of application Ser. No. 067,247, filed Aug. 17, 1979, abandoned which in turn is a continuation-in-part of Ser. No. 013,776, filed Feb. 21, 1979, now abandoned.

This invention relates to an acrylonitrile polymer useful in the melt-spinning of fiber. More particularly, this invention relates to such a polymer having a content of hydrophilic monomer which enables a transparent melt-spun fiber to be provided.

An ideal procedure for preparing synthetic fiber is by melt spinning. In this procedure a pure polymer is heated at atmospheric pressure to its melting point and above to provide a fluid melt which is extruded through a spinneret to form filaments which are subsequently cooled to solidify the polymer and further processed as necessary. This procedure is used commercially to prepare nylon and polyester fibers.

Acrylonitrile polymer fiber is highly desirable for many reasons including its esthetics and dyeability. This fiber is prepared commercially by either wet or dry spinning procedures. In both of these procedures the fiber-forming polymer is dissolved in a suitable polymer solvent to provide the fluid spinning composition necessary for extrusion. In wet spinning the fluid extrudate is precipitated in solid form by using a liquid coagulant which dilutes and washes out the polymer solvent. In dry spinning the fluid extrudate is converted to solid form by evaporating the solvent therefrom.

In using suitable solvents to dissolve the acrylonitrile polymer, the spinning procedures require the use of high molecular weight polymers to provide fiber of desirable physical properties. The high molecular weight polymers require extensive dilution of their solvent solutions to provide spinning compositions that have the proper flow characteristics for extrusion. As a result, less than about one third of the composition becomes fiber and the balance is removed as solvent. In order to make these spinning procedures economical and to prevent extensive environmental pollution, it is necessary to employ solvent recovery systems in association with processing. These solvent recovery systems add to the cost of processing and complicate operations.

It would be desirable to provide acrylonitrile polymer fiber by melt spinning a pure polymer melt but this is not possible since the polymer deteriorates or decomposes at temperatures well below its melting point. For this reason recourse was had to either wet or dry spinning procedures.

Much effort has been directed to eliminating polymer solvents in spinning acrylonitrile polymer fiber. Particular interest was shown in using non-solvents and particularly water as a processing aid. Certain of these developments have been reported in the patent literature and are discussed below. Certain of the teachings are conflicting and tend to complicate development of a suitable process for preparing acrylonitrile polymer fiber using non-solvent processing aids.

Coxe, in U.S. Pat. No. 2,585,444 Issued Feb. 12, 1952, (DuPont), recognized that the solvent requirements of wet and dry spinning procedures entailed expensive solvent recovery systems which desirably could be eliminated by proper use of non-solvent impregnants for the polymer. Coxe found that by using water as the polymer impregnant, hydrostatic extrusion could be more easily accomplished than when no polymer impregnant was employed. At the high hydrostatic pressure employed by Coxe, some polymer fusion occurred and, as Blickenstaff later reported (see below), the monofil obtained was sintered and full of voids.

In U.S. Pat. No. 3,388,202 issued June 11, 1968 to Opferkuch and Ross (Monsanto), it was disclosed that when an acrylonitrile polymer and water were heated under autogenous pressure to suitable temperature a polymer melt was obtained at a temperature below the degradation temperature of the polymer. At the water contents employed by the patentees a single phase melt of polymer and water was obtained. The patentees also taught that processing of the melt such as in the spinning of fiber would cause difficulties due to the pressure requirements.

In U.S. Pat. No. 3,402,231 issued Sept. 17, 1968 to Bynum, Baur and Thompson (Monsanto), it was taught that if an acrylonitrile polymer-water melt containing excess water as an additional phase was extruded at elevated temperature and pressure through a spinneret into the atmosphere, a fibrillated extrudate suitable for use in making paper was obtained. It was further taught that if a jet of high pressure steam was directed at the cross-section of the extrudate as it emerged from the spinneret, greater fibrillation would occur and the individual fibrils would be prevented from sticking together.

In U.S. Pat. No. 3,984,601 issued Oct. 5, 1976 to Blickenstaff (DuPont), there was disclosed a procedure to measure the range of water content that would provide the single phase fusion melt of acrylonitrile polymer and water discovered by Opferkuch and Ross. Blickenstaff taught spinning the melt through a spinneret into a dry-spinning environment to obtain fiber that was characterized by a sheath-core structure with a density gradient across the sheath, longitudinal striations along the fiber length as a result of subsequent stretching of the solidified fiber, optical voids within the core portion and a luster source due to reflective interfaces. The fiber had poor loop properties as well as poor dye intensity and high shade change of dyed fiber due to hot-wet processing because of its opaque nature. During the prosecution of the Blickenstaff reference, the nature of the Coxe product was characterized. It was subsequently learned through Turner (see below) that the process taught by Blickenstaff could not be scaled up to commercial levels of production due to polymer degradation problems.

In U.S. Pat. No. 3,896,204, issued July 22, 1975 to Goodman and Suwyn (DuPont), there was disclosed an improvement in the Blickenstaff process which comprised adding a small quantity of polymer solvent to the polymer-water melt. In this manner, the loop properties of the fiber were improved somewhat. However, the use of such a polymer solvent was contradictory to the basic aim of eliminating polymer solvent and recovery problems associated therewith. Additionally, the reference did not teach any further improvement in the Blickenstaff process or fiber so that the latter remained commercially unacceptable.

In British Pat. No. 1,446,649 issued Aug. 18, 1976 to Turner (DuPont), the inability of the Blickenstaff process to be scaled up to commercial production levels due to polymer degradation was disclosed. Turner taught that by coupling polymer preparation in melt form with extrusion of the polymer melt thus formed, polymer degradation could be reduced. However, no improvements in fiber properties over those obtained by Blickenstaff were taught and a commercially acceptable fiber was not produced.

At this stage of development, the prior art teaches that a single phase polymer-melt was extrudable, but no effort was made to control water removal from the nascent extrudate. In forming the melt, a solid polymer phase and a liquid water phase were heated under at least autogenous pressure to sufficient temperature to form a composition which became a single phase melt. While the polymer-water was maintained at suitable conditions of temperature and pressure, the single phase fusion melt was maintained and extrusion could be effected. However, when the pressure and temperature were reduced in order to solidify the extrudate, uncontrolled loss of water occurred and poor fiber structure resulted. At the lower conditions of temperature and pressure, the polymer reverted to solid form and the water reverted to a separate liquid or gaseous phase within the extrudate structure which upon subsequent removal from the extrudate structure by drying left irreversible void structure therein. In the references discussed thus far, the nascent extrudate was solidified under conditions in which no control over water removal from the nascent extrudate was exercised (Bynum et al.), in which as much water as possible was removed (Blickenstaff), or in which as much water as possible was retained in the extrudate (Coxe).

In German Offenlegungsschrift No. 2,403,947 issued Aug. 8, 1974 to Porosoff (American Cyanamid), the first attempt to control water removal of an extruded polymer-water melt was disclosed. In this process, a polymer-water melt was extruded through a spinneret directly into a steam-pressurized solidification zone. The conditions maintained in the solidification zone were such that the melt solidified with controlled loss of water, i.e., the rate of evaporation of water from the surface of the extrudate was such that a sheath-core structure was prevented. The steam conditions also maintained sufficient water content in the solidified extrudate so as to enable high levels of orientation stretching to be effected while the extrudate remained within the solidification zone and provided fiber of highly desirable physical properties for a wide variety of industrial applications. The fiber produced contained homogeneously dispersed void structure over the fiber cross-section which resulted in opaque character and limited utility to applications in which dyeability was not critical.

In copending applications Ser. No. 895,576 filed Apr. 12, 1978, U.S. Pat. No. 4,205,039 and Ser. No. 853,014 filed Nov. 17, 1977, abandoned, there are described respectively a process for preparing a void-free fiber and the resulting fiber wherein an acrylonitrile polymer-water melt is processed. In the processing taught in these applications, further control of the rate of water evaporation from the nascent extrudate is taught so that the resulting fiber will be transparent and have desirable dyeing characteristics for textile uses while retaining the desirable physical properties taught by Porosoff. Such processing includes using a hydrophilic acrylonitrile polymer as the fiber-forming polymer, limiting the content of water in the polymer-water melt extruded, extruding into a steam-pressurized solidification zone to control the release of water and maintain sufficient water to provide orientation stretching and removing residual water under controlled conditions of temperature and humidity.

Although acrylonitrile polymer fiber with acceptable textile properties can now be produced at commercial levels of production in accordance with the teachings of the copending applications discussed above, there nevertheless arise certain improvements over those teachings that further benefit the art. Such developments fulfill special needs and constitute significant advances in the art.

In accordance with the present invention there is provided a fiber-forming acrylonitrile polymer composition comprising from about 80 to 95 weight percent of acrylonitrile from about 4 to about 19 weight percent of a hydrophobic monomer copolymerizable with acrylonitrile and from about 1 to about 10 weight percent of hydrophilic copolymerizable monomer of the structure:

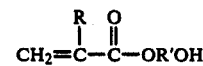

wherein R is hydrogen or methyl and R' is alkylene of 1 to 3 carbon atoms, said polymer having a kinematic molecular weight value in the range of about 30,000 to about 60,000, said molecular weight value being obtained from the relationship $\mu = 1/A(\overline{M})_k$ wherein $\mu$ is the average effluent time in seconds for a solution of 1 gram of polymer in 100 milliliters of 50 weight percent aqueous sodium thiocyanate solvent at 40° C. multiplied by the viscometer factor, A is the solution factor derived from a polymer of known molecular weight and $\overline{M}_k$ is the kinematic molecular weight.

The polymer of the present invention by virtue of its hydrophilic content enables melt-spun fibers provided therefrom to be processed to yield substantially void-free fiber having excellent dyeing characteristics and physical properties. The polymer is readily prepared with available monomers by conventional procedures.

In providing the fiber-forming acrylonitrile polymer of the present invention, three monomers are used. A major portion of acrylonitrile, i.e., about 80 to 95 weight percent, preferably about 85 to 90 weight percent, is employed to provide desirable physical properties. A hydrophobic comonomer is also used in minor amounts, i.e., about 4 to 19 weight percent, to improve characteristics of the polymer for use in melt-spinning procedures. In addition, a hydrophilic comonomer, which is a hydroxyalkylacrylate is used in minor amounts, i.e., about 1 to 10 weight percent, preferably about 2 to 8 weight percent, is employed to provide hydrophilic moieties which enable the substantially transparent fiber to be provided.

The fiber-forming acrylonitrile polymer of the composition indicated can be readily prepared by conventional polymerization procedures, preferably by suspension technique. A preferred polymerization initiator is a redox system employing an oxidizing agent such as sodium chlorate and a reducing agent such as sodium bisulfite at least in part. This redox system provides sulfonic acid end groups on the polymer chains which serve as dyesites in the fiber. The polymer will generally have a kinematic molecular weight value in the range of about 30,000 to 60,000, preferably about 38,000 to 46,000.

Suitable hydrophobic comonomers useful in preparing the fiber-forming acrylonitrile polymer of the present invention includes methyl acrylate, ethyl acrylate, butyl acrylate, methoxymethyl acrylate, beta-chlorethyl acrylate, and the corresponding esters of methacrylic acid and chloroacrylic acid; vinyl chloride, vinyl fluoride, vinyl bromide, vinylidene chloride, vinylidene bromide, allyl chloride, 1-chloro-1-bromoethylene; methacrylonitrile; methyl vinyl ketone; vinyl formate, vinyl propionate, vinyl stearate, vinyl benzoate; N-vinylphthalimide, N-vinylsuccinimide; methylene malonic esters; itaconic esters; N-vinylcarbazole; vinyl furan; alkyl vinyl ethers; diethyl citraconate, diethylmesaconate; styrene, dibromostyrene; vinyl napthalene; 2-methyl-1-vinylimidazole; 4-methyl-1-vinylimidazole, 5-methyl-1-vinylimidazole; and the like.

Suitable hydrophilic comonomers include, for example, hydroxymethyl acrylate, hydroxymethyl methacrylate, hydroxyethyl acrylate, hydroxyethyl methacrylate, 2-hydroxy-1-methylethyl acrylate and 3-hydroxypropyl acrylate.

In preparing fiber using the fiber-forming acrylonitrile polymer of the present invention, a melt-spinning procedure employing a homogeneous single-phase fusion melt of the polymer and water is followed with the necessary processing steps indicated. A homogeneous single-phase fusion melt of the selected polymer and water in proper proportions is prepared according to conventional procedures. Usually the amount of water in the composition will be about 5 to 30 weight percent, preferably 10 to 20 weight percent based on the total weight of polymer and water. Conveniently, the polymer crumb obtained from suspension polymerization will be dried to this water content and can be used without any addition of water and working of the mixture to effect polymer adsorption of the water. The particular polymer-water mixture is then processed in a suitable extruder to provide a homogeneous single-phase fusion melt at appropriate temperature and pressure, usually about 140° C. or higher and autogenous pressure.

After the fusion melt is obtained, it is extruded through a spinnerette assembly directly into a steam-pressurized solidification zone maintained under conditions which prevent a sheath-core structure in the nascent extrudate, avoid a density gradient therein, and minimize void formation. Generally, the steam pressure will be provided by saturated steam at a pressure equivalent to a temperature that is at least about 10° C. below the minimum melting point of the polymer-water composition but not more than about 30° C. below such temperature. Under these conditions, the nascent extrudate will solidify without the structural defects noted and will remain in a plastic state so that desired orientation stretching can be effected. It is preferred to conduct such stretching while the nascent extrudate remain within the solidification zone and thus avoid added subsequent steps for the same purpose. The stretch ratio achieved should be that necessary to provide desirable textile properties, usually a stretch ratio of 25 or more is desirable and such stretch ratio may be achieved in one or more stages. It is generally preferable to conduct at least two stages of stretch with the stretch ratio in the subsequent stage or stages exceeding that of the first stage since such stretching appears to maximize fiber properties.

After the fiber has been solidified and stretched as indicated, it is next subjected to drying under controlled conditions of humidity and temperature to remove residual water in the fiber without formation of a separate water phase within the fiber structure. This drying is effected using a dry bulb temperature in the range of about 100°–150° C. and a wet-bulb temperature in the range of about 40°–100° C. The time of drying may vary depending upon the conditions employed but generally will be about 10–20 minutes. This drying step is conducted before any uncontrolled or tensionless shrinkage of the fiber has occurred and may be conducted in tensioned or tensionless state.

After conducting the drying step as described, additional optional processing steps may be conducted as desired. A preferred optional step is to subject the dried fiber to relaxation in steam to achieve shrinkage of about 5 to 40%. This relaxation step eases tensions within the fiber structure and generally provides a better balance of individual physical properties.

The fiber obtained, as indicated, has desirable physical properties for textile purposes. It also has a high degree of transparency with substantially no void structure and shows high dye intensity and minimum shade change due to hot-wet processing. Values for dye intensity and shade change are obtained as follows.

DYE INTENSITY

A sample of fiber is dyed with Basic Blue 1 at 0.5 weight percent, based on the weight of fiber, to complete exhaustion. The dyed sample is then dried in air at room temperature and a reflectance measurement is made versus a control using the Color-Eye at 620 millimicrons. The control sample is a commercial wet spun acrylic fiber of the same denier dyed and handled in the same manner as the experimental fiber. The result is reported as the percent reflectance of that achieved by the control. In the case where the experimental fiber has more void structure than the control, there will be more light scattered and the dyed experimental fiber will register less than 100% reflectance at 620 millimicrons. The fiber will also appear to the eye to be lighter in color than the control.

SHADE CHANGE

A twenty gram sample of carded and scoured fiber is dyed with 0.5 weight percent of Calcozine Blue 6G, based on the weight of fiber, at the boil until complete exhaustion occurs. One portion of the dyed fiber is dried in air at room temperature. Another portion is dried in an oven at 300° F., for 20 minutes. Reflectances of both samples are obtained using the Color-Eye at 620 millimicrons. The change in reflectance of the oven-dried sample relative to the reflectance of the air dried sample is the shade change.

The invention is more fully illustrated in the examples which follow wherein all parts and percentages are by weight unless otherwise specified.

COMPARATIVE EXAMPLE A

A conventional polymer composition was prepared and melt-spun into fiber for comparison purposes. The polymer was prepared in a continuous reactor using the following feed and conditions;

| | |
|---|---|
| Acrylonitrile (AN) | 27.2% |
| Methyl methacrylate (MMA) | 2.8% |
| Sodium Chlorate | 0.1% |
| Sodium bisulfite | 1.01% |
| Sodium nitrate | 0.69% |

| | |
|---|---|
| Water | 68.2% |
| Reactor temperature | 50° C. |
| Residence time | 54 minutes |

The polymer thus formed was thoroughly washed and dewatered in a centrifuge. The washed polymer contained 89.3% AN and 10.7% MMA and had a $\overline{M}_k$ of 59,000. Percent conversion of monomer to polymer was 80.5%.

The dewatered polymer was mixed with glycerol stearate type lubricant and conventional caking agent and dewatered to a water content of 17.4%. The powdered composition resulting was melted in an extruder to form a fusion melt which was extruded through a spinneret having 5016 orifices each of 140 micron diameter. The melt zone of the extruder was 168° C. and the pump outlet was 171° C. Production rate was 60 lb. per hour. The extrudate was extruded directly into a steam-pressurized solidification zone pressurized with 22 psig saturated steam. The extrudate while within the steam pressurized solidification zone was stretched in a first stage at a ratio of 1.6 and in a second stage at a ratio of 10.0 relative to the linear speed of the fusion melt through the spinneret to provide a total stretch of 16.0. The fiber as produced had a denier of 8 per filament.

The stretched tow was dried in a free-to-shrink stage for 20 minutes at a dry bulb-temperature of 150° C. and a wet bulb temperature of 90° C. The dried fiber tow was then relaxed in steam at 123° C. for 15 minutes in a free-to-shrink condition. The total shrinkage after relaxation was 30% and the resulting filament denier was 11.5. This fiber showed a dye intensity of 44 versus commercially wet-spun fiber of the same polymer composition when dyed with Basic Blue 1 at 0.5% based on the weight of the fiber to complete exhaustion. The fiber had a shade change value of 45. Microscopic examination showed most of the filaments had void structures.

EXAMPLE 1

The procedure of Comparative Example A was followed except that the composition was as follows:

| | |
|---|---|
| Acrylonitrile | 30.51 parts |
| Methyl methacrylate | 2.51 parts |
| 75% 2-hydroxypropyl acrylate/ 25% 2-hydroxy-1-methyl ethyl acrylate (HPA) | 2.98 parts |
| Sodium chlorate | 0.218 parts |
| Sodium bisulfite | 0.648 parts |
| β-mercaptoethanol | 0.144 parts |
| Sodium nitrate | 0.277 parts |
| Copper sulfate decahydrate | 540 ppm |
| Water | 82.3 parts |

A polymer of the composition 84.6% AN, 7.6% MMA, and 7.8% HPA was obtained with $\overline{M}_k$ 45,557 and monomer conversion of 92.3%. Polymer was processed as above except at 15% water content.

A fusion melt was obtained at 157° C. and spun at 122 meters per minute through a spinnerette plate containing 151 orifices, each of 120 micron diameter directly into a steam-pressurized solidification zone maintained at 13 psig with saturated steam. While in the solidification zone, the filaments were stretched in a first stage at a ratio of 8.1 and in a second stage at a ratio of 3.14 for a total stretch of 25.4. The resulting 3.66 d/f fiber was relaxed to give a 6.1 d/f fiber. The fiber had a dye intensity of 95% and a shade change of 4 relative to the wet spun fiber which has arbitrary values of 100% and 0, respectively. Physical properties were as follows.

| | |
|---|---|
| Straight tenactity | 2.4 grams/denier |
| Straight Elongation | 30% |
| Loop Tenacity | 1.4 grams/denier |
| Loop Elongation | 16% |

EXAMPLE 2

The procedure of Example 1 was followed using a composition as follows:

| | |
|---|---|
| AN | 31.97 parts |
| MMA | 2.16 parts |
| HPA | 1.87 parts |
| Sodium Chlorate | 0.236 parts |
| Sodium bisulfite | 0.746 parts |
| β-mercaptoethanol | 0.220 parts |
| Sodium nitrate | 0.183 parts |
| Copper sulfatedecahydrate | 500 ppm |
| Water | 82.01 parts |

A polymer of the composition 88.5% AN, 6.3% MMA, and 5.2% HPA was obtained with $\overline{M}_k$ 42,635 and monomer conversion of 95.0%. Polymer was processed as above but at 15.2% water content.

A fusion melt was obtained at 157° C. and spun at 220 m/min. Spinning was as above but stretching in the first stage was at a ratio of 7.2 and in the second stage at a ratio of 4.19 for a total stretch of 30.2. The resulting tow of 2.1 d/f was relaxed to give a 3.5 d/f fiber. The fiber exhibited a dye intensity of 89% and shade change of 2. Physical properties were as follows:

| | |
|---|---|
| Straight Tenacity | 3.3 g/d |
| Straight Elongation | 32% |
| Loop Tenacity | 1.5 g/d |
| Loop Elongation | 13% |

EXAMPLE 3

The procedure of Example 1 was again followed except that the composition was as follows:

| | |
|---|---|
| AN | 34.7 parts |
| MMA | 2.54 parts |
| HPA | 1.31 parts |
| Sodium Chlorate | 0.254 parts |
| Sodium bisulfite | 0.759 parts |
| β-mercaptoethanol | 0.245 parts |
| Sodium nitrate | 0.194 parts |
| Copper sulfate decahydrate | 580 ppm |
| Water | 89.35 parts |

A polymer of the composition 90.1% AN, 6.9% MMA, and 3.0% HPA was obtained with $\overline{M}_k$ 38,700 and conversion 96.3%. Polymer was processed as above except at 15.9% water content.

A fusion melt was obtained at 161° C. and spun at 232 m/min. The first stretch ratio was 4.9 and the second stretch ratio was 5.98 for a total stretch of 29.3. The resulting tow of 2.0 d/f was relaxed to give a 3.4 d/f fiber. The fiber exhibited a dye intensity of 57% and a shade change of 7. Physical properties were as follows:

| | |
|---|---|
| Straight Tenacity | 3.2 g/d |
| Straight Elongation | 27% |
| Loop Tenacity | 1.0 g/d |
| Loop Elongation | 4% |

EXAMPLE 4

The procedure of Example 1 was again followed except that the composition was as follows:

| | |
|---|---|
| AN | 34.6 parts |
| MMA | 3.26 parts |
| HPA | 0.93 parts |
| Sodium chlorate | 0.257 parts |
| Sodium bisulfite | 0.779 parts |
| β-mercaptoethanol | 0.242 parts |
| Sodium nitrate | 0.135 parts |
| Copper sulfate decahydrate | 580 ppm |
| Water | 89.79 parts |

A polymer of the composition 88.9% AN, 9.1% MMA and 2.0% HPA was obtained with $\overline{M}_k$ 39,681 and conversion 92%. Polymer was processed as above at 15.1% water content.

A fusion melt was obtained at 160° C. and spun at 232 m/min. Stretching was as in Example 3. The resulting tow of 2.0 d/f was relaxed to give 3.2 d/f fiber. The fiber exhibited a dye intensity of 83% and a shade change of 12. Physical properties were as follows:

| | |
|---|---|
| Straight Tenacity | 3.7 g/d |
| Straight Elongation | 33% |
| Loop Tenacity | 1.5 g/d |
| Loop Elongation | 14% |

EXAMPLE 5

The procedure of Example 1 was again followed except that the composition was as follows:

| | |
|---|---|
| AN | 34.5 parts |
| MMA | 2.33 parts |
| HPA | 2.07 parts |
| Sodium chlorate | 0.254 parts |
| Sodium bisulfite | 0.766 parts |
| β-mercaptoethanol | 0.215 parts |
| Sodium nitrate | 0.195 parts |
| Copper sulfate decahydrate | 570 ppm |
| Water | 89.17 Parts |

A polymer of the composition 87.7% AN, 7.1% MMA, and 5.2% HPA was obtained with $M_k$ 44,891 and conversion 83.6%. Polymer was processed as above except at 16.6% water content.

A fusion melt was obtained at 166° C. and spun at 232 m/min. Stretching was as in Example 3. The resulting tow of 2.0 d/f was relaxed to give a 3.1 d/f fiber. The fiber exhibited a dye intensity of 77% and a shade change of 12. Physical properties were as follows:

| | |
|---|---|
| Straight Tenacity | 3.5 g/d |
| Straight Elongation | 37% |
| Loop Tenacity | 2.6 g/d |
| Loop Elongation | 20% |

We claim:

1. A melt-spinnable fiber-forming acrylonitrile polymer composition comprising from about 5 to 30 weight percent of water and, correspondingly, from about 95 to 70 weight percent of a polymer consisting of the polymerization reaction product of from about 80 to about 95 weight percent of acrylonitrile, from about 4 to 19 weight percent of a hydrophobic monomer copolymerizable with acrylonitrile and from about 1 to about 10 weight percent of a hydrophilic copolymerizable monomer of the structure:

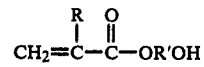

wherein R is hydrogen or methyl and R' is alkylene of 1 to 3 carbon atoms, said polymer having a kinematic molecular weight value in the range of about 30,000 to about 60,000, said molecular weight value being obtained from the relationship $\mu = 1/A(\overline{M}_k)$ wherein $\mu$ is the average effluent time in seconds for a solution of 1 gram of polymer in 100 milliliters of 50 weight percent aqueous sodium thiocyanate solvent at 40° C. multiplied by the viscometer factor, A is the solution factor derived from a polymer of known molecular weight and $\overline{M}_k$ is the kinematic molecular weight.

2. The polymer composition of claim 1 wherein the acrylonitrile content is about 85–90 weight percent.

3. The polymer composition of claim 1 wherein the hydrophobic monomer is methyl methacrylate.

4. The polymer composition of claim 1 wherein the hydrophobic monomer content is about 6 to 12 weight percent.

5. The polymer composition of claim 1 wherein the hydrophilic monomer content is about 2.0 to 8.0 weight percent.

6. The polymer of claim 1 wherein the hydrophilic monomer is hydroxypropylacrylate.

7. The polymer of claim 1 wherein the kinematic molecular weight is in the range of about 38,000 to 46,000.

* * * * *